United States Patent
Fang

(10) Patent No.: US 9,294,195 B2
(45) Date of Patent: Mar. 22, 2016

(54) METHOD, DEVICE, AND SYSTEM FOR SAVING ENERGY IN OPTICAL COMMUNICATION

(71) Applicant: Huawei Technologies Co., Ltd., Shenzhen, Guangdong (CN)

(72) Inventor: Qingyin Fang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 152 days.

(21) Appl. No.: 14/027,989

(22) Filed: Sep. 16, 2013

(65) Prior Publication Data

US 2014/0016944 A1 Jan. 16, 2014

Related U.S. Application Data

(63) Continuation of application No. PCT/CN2011/081443, filed on Oct. 27, 2011.

(51) Int. Cl.
  *H04B 10/27* (2013.01)
  *H04B 10/40* (2013.01)

(52) U.S. Cl.
  CPC ............... *H04B 10/27* (2013.01); *H04B 10/40* (2013.01)

(58) Field of Classification Search
  CPC ............................ H04B 10/27; H04B 10/40
  USPC ................... 298/195, 197, 299, 162
  See application file for complete search history.

(56) References Cited

U.S. PATENT DOCUMENTS

2002/0149810 A1 10/2002 Brown et al.
2003/0076569 A1* 4/2003 Stevens ............... H04B 10/504 398/192
2009/0169209 A1 7/2009 Sugawara et al.
2010/0221000 A1* 9/2010 Yang ..................... H04B 10/03 398/38

FOREIGN PATENT DOCUMENTS

| CN | 1479477 A | 3/2004 |
| CN | 1612514 A | 5/2005 |
| CN | 101471731 A | 7/2009 |
| CN | 102185658 A | 9/2011 |

OTHER PUBLICATIONS

International Search Report dated Aug. 16, 2012 in connection with International Patent Application No. PCT/CN2011/081443.

* cited by examiner

*Primary Examiner* — David Payne
*Assistant Examiner* — Omar S Ismail

(57) ABSTRACT

Embodiments of the present invention disclose a method, a device, and a system for saving energy in optical communication. The method includes the following: sending first information to an optical communication device at a peer end through the optical module by using a first transmit optical power; receiving, through the optical module, second information that is returned by the optical communication device at the peer end after it receives the first information; and reducing, according to the first transmit optical power, and a receive optical power value and minimum receive optical power value in the received second information, the transmit optical power value of the optical module of the optical communication device to a difference value between the first transmit optical power value and the receive optical power value plus the minimum receive optical power value of the optical communication device at the peer end and a margin value.

16 Claims, 2 Drawing Sheets

METHOD, DEVICE, AND SYSTEM FOR SAVING ENERGY IN OPTICAL COMMUNICATION

CROSS-REFERENCE TO RELATED APPLICATIONS

This application is a continuation of International Application No. PCT/CN2011/081443, filed on Oct. 27, 2011, which is hereby incorporated by reference in their entireties.

TECHNICAL FIELD

The present invention relates to a communications field, and in particular to a method, a device, and a system for saving energy in optical communication.

BACKGROUND

Optical communication is a communication mode in which optical waves are transmission media. As the costs for an optical fiber and an optical module (Optical module) decrease, optical communication is increasingly widely used in data transmission. An optical module is generally formed by an optoelectronic component, a functional circuit, an optical interface, and so on. The optoelectronic component includes two parts: transmit and receive. The function of the transmit part is to: after processing, through an internal driver chip, of electric signals input at a certain code rate, drive a semiconductor laser device (LD) or a light-emitting diode (LED) to transmit modulated optical signals at the corresponding rate. An optical power automatic control circuit is built in the transmit part to stabilize the power of the output optical signals. The function of the receive part is to: convert, through an optical detection diode, optical signals input at a certain code rate into electric signals, and then output electric signals at the corresponding code rate through a preamplifier. In addition, as the implemented functions are complicated, the optical module is an apparatus with large power consumption among optical communication devices.

To reduce the power consumption of an optical communication device, a method is provided in the prior art where a monitoring module is established in the optical communication device, and the monitoring module shuts down the optical module when detecting that the optical module has no optical signal input or output, thereby reducing the power consumption of the optical communication device. Because the optical module is shut down, when signals need to be transmitted to or received from the peer device again, the optical module cannot immediately set up a connection with the peer device, affecting communication real time.

SUMMARY

Embodiments of the present invention provide a method, a device, and a system for saving energy in optical communication to solve the problem in the prior art that optical communication real time is poor because an optical communication device is shutdown in order to reduce device power consumption. Through these embodiments, the power consumption of the optical communication device is lowered without shutting down an optical module, thereby ensuring real-time optical communication while reducing the power consumption, and improving the communication efficiency of the optical communication device.

To address the preceding technical problem, the embodiments of the present invention use the following technical solutions:

A method for saving energy in optical communication, applied to an optical communication device, where the optical communication device is connected by using an optical fiber to an optical communication device at a peer end for optical communication, and the method includes:

setting a value of transmit optical power of the optical communication device to a first transmit optical power value to send first information to the optical communication device at the peer end by using an optical fiber;

receiving second information that is returned by the optical communication device at the peer end after it receives the first information, where the second information includes a receive optical power value of the optical communication device at the peer end when it receives the first information and a minimum receive optical power value that is recognizable for the optical communication device at the peer end; and according to the first transmit optical power, and the receive optical power value and the minimum receive optical power value in the received second information, adjusting the value of transmit optical power of the optical communication device to make it be a difference value between the first transmit optical power value and the receive optical power value plus the minimum receive optical power value of the optical communication device at the peer end and a margin value.

A method for saving energy in optical communication, applied to an optical communication device, where the optical communication device is connected by using an optical fiber to an optical communication device at a peer end for optical communication, and the method includes:

receiving first information sent from the optical communication device at the peer end, where the first information is information sent by using an optical fiber by setting a value of transmit optical power of the optical communication device at the peer end to a first transmit optical power value; and sending second information to the optical communication device at the peer end, where the second information includes a receive optical power value when the first information is received and a minimum receive optical power value that is recognizable for the optical communication device, and adjusting, by the optical communication device at the peer end, according to the first transmit optical power, and the receive optical power value and the minimum receive optical power value in the received second information, the value of transmit optical power of the optical communication device to make it be a difference value between the first transmit optical power value and the receive optical power value plus the minimum receive optical power value and a margin value.

An optical communication device, including a processor and an optical module, where the processor is connected to the optical module, the optical module is connected to an optical communication device at a peer end by using an optical fiber, and is configured to send first information to the optical communication device at the peer end by using a first transmit optical power through the optical fiber;

the optical module is further configured to receive second information that is returned by the optical communication device at the peer end after it receives the first information, where the second information includes a receive optical power value of the optical communication device at the peer end when it receives the first information and a minimum receive optical power value that is recognizable for the optical communication device at the peer end; and the processor is configured to, according to the first transmit optical power, and the receive optical power value and minimum receive optical power value in the received second information, adjust the value of transmit optical power of the optical communication device to make it be a difference value between the first transmit optical power value and the receive optical power value plus the minimum receive optical power value of the optical communication device at the peer end and a margin value.

An optical communication device, including a processor and an optical module, where the processor is connected to the optical module, the optical module is connected to an optical communication device at a peer end by using an optical fiber, and is configured to receive first information sent from the optical communication device at the peer end, where the first information is information sent by using the optical fiber by setting a value of transmit optical power of the optical communication device at the peer end to a first transmit optical power value;

the optical module is further configured to send second information to the optical communication device at the peer end, where the second information includes a receive optical power value when the first information is received and a minimum receive optical power value that is recognizable for the optical communication device, a processor of the optical communication device at the peer end adjusts, according to the first transmit optical power, and the receive optical power value and minimum receive optical power value in the received second information, the value of transmit optical power of the optical communication device to make it be a difference value between the first transmit optical power value and the receive optical power value plus the minimum receive optical power value and a margin value.

A system for saving energy in optical communication, including a first optical communication device and a second optical communication device, where the first optical communication device includes a first processor and a first optical module, and the first processor is connected to the first optical module; the second optical communication device includes a second processor and a second optical module, and the second processor is connected to the second optical module; the first optical module is connected to the second optical module by using an optical fiber for optical communication, the first processor sends first information through the first optical module to the second optical communication device by using a first transmit optical power;

the second processor in the second optical communication device returns second information through the second optical module to the first processor after receiving the first information through the second optical module, where the second information includes a receive optical power value when the second processor receives the first information and a minimum receive optical power value that is recognizable for the second optical module; and the first processor is configured to, according to the first transmit optical power, and the receive optical power value and minimum receive optical power value in the received second information, reduce the value of transmit optical power of the first optical module to a difference value between the first transmit optical power value and the receive optical power value plus the minimum receive optical power value of the second optical communication device and a margin value.

By sending first information that includes a first transmit optical power value to an optical communication device at a peer end, receiving second information that carries information about a receive optical power value and a minimum receive optical power value of the optical communication device at the peer end and is sent from the optical communication device at the peer end, and reducing the transmit optical power value according to the receive optical power value and minimum receive optical power value of the optical communication device at the peer end, the method, device, and system for saving energy in embodiments of the present invention reduce the power consumption of an optical communication device when the optical module works properly, and ensure real-time working of the optical communication device and improve the communication efficiency as the optical module works properly.

BRIEF DESCRIPTION OF THE DRAWINGS

To better describe technical solutions in the embodiments of the present invention or in the prior art, the accompanying drawings that need to be used in the description of the embodiments are briefly described below. Apparently, the accompanying drawings described below describe only some embodiments of the present invention. Those skilled in the art may obtain other accompanying drawings based on these accompanying drawings without innovative efforts.

DETAILED DESCRIPTION

A method and an apparatus for saving energy in optical communication are provided in embodiments of the present invention, which implement the following: reducing the power consumption of an optical communication device when an optical module works properly and improving the communication efficiency.

The following describes the embodiments of the present invention with reference to the accompanying drawings in detail.

Embodiment 1

Figure 1:
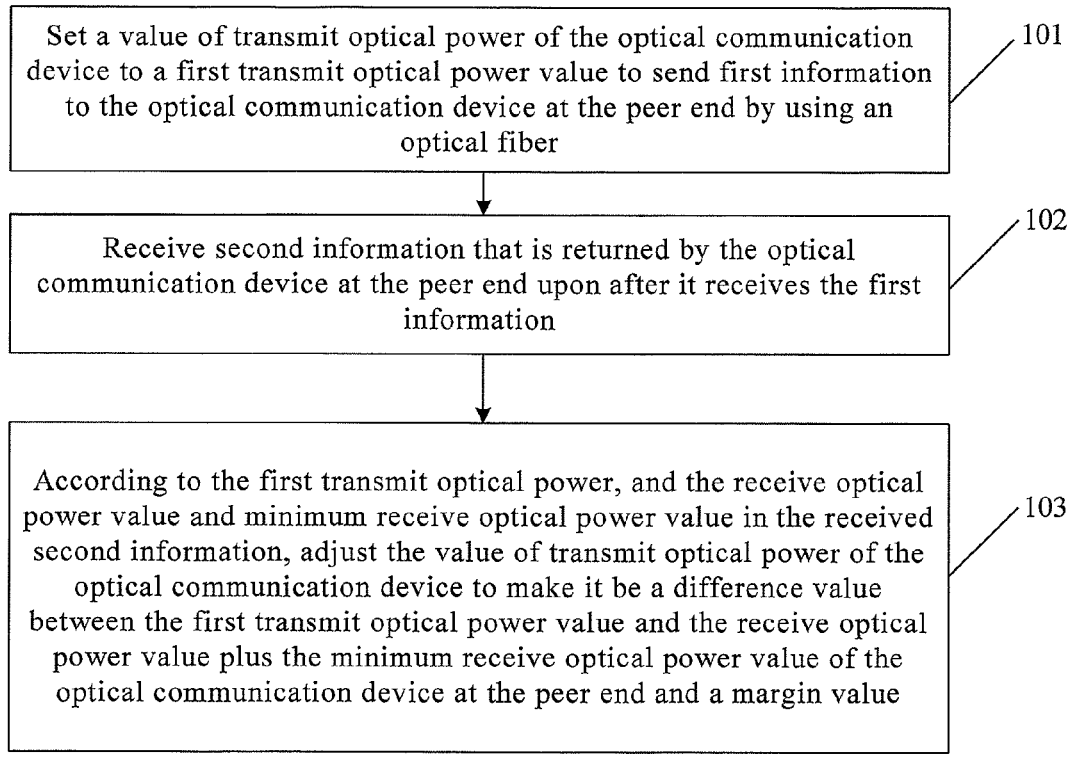
FIG. 1 is a flowchart of a method for saving energy in optical communication according to an embodiment of the present invention.

This embodiment provides a method for saving energy in optical communication, which is applied to an optical communication system. The system includes an optical communication device at a local end and an optical communication device at a peer end, each optical communication device has an optical module and a processor inside the device. The optical module is configured to implement transmit and receive operations on optical signals, the optical modules in the devices at both ends are connected by using an optical fiber, and the processors are configured to process the signals transmitted and received by the optical modules. As shown in FIG. 1, this embodiment describes the method for saving energy from the aspect of the optical communication device at the local end. Unless otherwise specified, a "processor" and an "optical module" without the modifiers "local" and "peer" indicate the "processor in the optical communication device at the local end" and the "optical module in the optical communication device at the local end". The optical transmit power of the optical module is called the transmit optical power of the optical communication device. Specifically, the method for saving energy in optical communication includes the following steps:

Step 101: Set a value of transmit optical power of the optical communication device to a first transmit optical power value to send first information to the optical communication device at the peer end by using an optical fiber.

The optical communication device in this embodiment includes a processor and an optical module, and the processor is connected to the optical module. Specifically, the processor may be connected to the optical module by using an I2C bus. The transmit optical power of the optical communication device is also the transmit optical power of the optical module. In actual applications, if the optical communication device uses a hardware optical transmit component similar to the optical module, the transmit optical power may also be the transmit optical power of the similar component for optical transmission. The optical module in the optical communication device is connected to the optical communication device at the peer end by using an optical fiber for optical communication. During long-distance transmission, the optical signals sent by the optical communication device may suffer attenuation in the optical fiber. Therefore, when the first information sent by the optical communication device by using the first transmit optical power value PAs as the first transmit optical power arrives at the optical communication device at the peer end that serves as the destination optical communication device, its optical power value may be reduced to a certain extent. In this embodiment, the optical power of the first information when the information arrives at the optical communication device at the peer end is called a "receive optical power", and the receive optical power value is marked as PBr. In this case, attenuation of the optical signal power value between the optical communication device and the optical communication device at the peer end is as follows:

$$PAs-PBr.$$

Step 102: Receive second information that is returned by the optical communication device at the peer end after it receives the first information, where the second information includes a receive optical power value of the optical communication device at the peer end when it receives the first information and a minimum receive optical power value that is recognizable for the optical communication device at the peer end.

Receive sensitivity indicates the minimum receive optical power value that is recognizable for a device. Each optical communication device has its transmit and receive optical power thresholds. The maximum receive optical power of the optical communication device at the peer end is marked as PBr_H, and the receive sensitivity (minimum receive optical power) is marked as PBr_L. When the power value of a received signal is larger than PBr_H or smaller than PBr_L, the optical communication device at the peer end cannot normally receive the signal. Therefore, the power value of the first information received by the optical communication device at the peer end from the optical communication device should meet the following condition:

$$PBr\_H > PBr > PBr\_L.$$

After receiving the first information from the optical communication device, the optical communication device at the peer end reads parameter values stored in the optical communication device at the peer end, where the parameter values include the receive sensitivity PBr_L of the optical communication device at the peer end, and the device sends the second information that carries information such as the receive optical power value PBr and the receive sensitivity PBr_L to the optical communication device.

The optical communication device receives the second information from the optical communication device at the peer end.

Step 103: According to the first transmit optical power, and the receive optical power value and minimum receive optical power value in the received second information, adjust the value of transmit optical power of the optical communication device to make it be a difference value between the first transmit optical power value and the receive optical power value plus the minimum receive optical power value of the optical communication device at the peer end and a margin value.

According to the first transmit optical power value of the first information in the optical communication device and the receive optical power value when the first information arrives at the optical communication device at the peer end, the processor is capable of calculating the attenuation of a sent signal in the optical fiber, that is, PAs−PBr. Because the minimum receive optical power of the optical communication device at the peer end is PBr_L, the power value of the first information sent by the optical communication device cannot be smaller than PBr_L when the first information arrives at the optical communication device at the peer end. Therefore, the transmit optical power value PAs of the first information is at least:

$$(PAs-PBr)+PBr\_L.$$

Factors such as devices and environment may bring a certain error to the calculation. In addition, after the optical module runs for a certain period of time, its transmit optical power may suffer attenuation. Therefore, to ensure reliability of the optical communication device, a certain margin value LP needs to be reserved for the destination optical communication device. Therefore, the transmit optical power value PAs of the first information may be adjusted to make it be a value as follows:

$$(PAs-PBr)+PBr\_L+\Delta P,$$

where, the value of ΔP may be properly selected according to the actual situation (for example, by considering an error and reliability), and generally, a number equal to or larger than 0 may be selected.

After the processor has calculated the proper transmit optical power, the processor sends, by using the I2C bus, the optical module a control instruction to modify parameters stored in the memory of the optical module to reduce the transmit optical power. After the transmit optical power is reduced, the power of the optical communication device is reduced accordingly.

After adjusting the transmit optical power, the optical communication device further needs to check whether the adjusted transmit optical power is within a normal range, that is, the reduced transmit optical power value of the optical communication device is not larger than the maximum transmit optical power value PAs_H of the optical communication device and not smaller than the minimum transmit optical power value PAs_L of the optical communication device. If the adjusted transmit optical power is not within the normal range, the transmit optical power value needs to be further adjusted to make it be within the normal range. For example, if the value of (PAs−PBr)+PBr_L is smaller than PAs_L, the adjusted optical power that is transmitted is at least PAs_L.

By performing the preceding steps, the optical communication device may reduce the transmit optical power, thereby reducing the power consumption.

Further, in this embodiment, information about the receive sensitivity Par_L and the transmit optical power value PAs of the optical communication device may further be carried in the first information sent by the optical communication device. After receiving the first information, the optical communication device at the peer end adjusts the transmit optical power value of the optical communication device at the peer end according to the power value PBr of the firs information when the information arrives at the optical communication device at the peer end. The adjusted transmit optical power value is at least:

(PAs−PBr)+PAr_L.

Because factors such as devices and environment may bring a certain error to the calculation, a certain margin value ΔP needs to be reserved for the destination optical communication device. Therefore, the transmit optical power of the optical communication device at the peer end may be adjusted to make it be a value as follows:

(PAs−PBr)+PAr_L+ΔP, where, the value of ΔP may be properly selected according to the actual situation.

It can be seen that, through the simple signal interaction, the adjustment to the transmit optical power values of the optical communication device and the optical communication device at the peer may be performed at the same time, thereby reducing the power consumption of the optical communication devices and improving the communication efficiency.

Further, after the optical module runs for a period of time, its transmit optical power may suffer attenuation. The optical fiber may encounter aging after it is used for a long time, which worsens attenuation. Therefore, to ensure data accuracy and prevent a bursting event from bringing an unfavorable impact on an optical communication device, in this embodiment, whether the transmit optical power value and receive optical power value of the optical communication device are within normal ranges is detected regularly. Being within normal ranges means that the transmit optical power value is within a range from the maximum transmit optical power value to the minimum transmit optical power, and the receive optical power value is within a range from a maximum receive optical power value to a minimum receive optical power;

If the transmit optical power value and receive optical power value of the optical communication device are not within normal ranges, first information needs to be sent to the optical communication device at the peer end again, and the preceding steps are repeated to adjust the transmit optical power value. Likewise, the optical communication device at the peer end may also detect regularly whether its transmit optical power value and its receive optical power value are within normal ranges.

By sending first information that includes the value of transmit optical power to an optical communication device at a peer end, receiving second information that carries information about a receive optical power value and a minimum receive optical power value of the optical communication device at the peer end from the optical communication device at the peer end, and reducing the transmit optical power value according to the receive optical power value and minimum receive optical power value of the optical communication device at the peer end, the method for saving energy in this embodiment reduces the power consumption of an optical communication device when the optical module works properly. In addition, information about the minimum receive optical power value and transmit optical power value of the optical communication device may be further carried in the first information sent by the optical communication device. After receiving the first information, the optical communication device at the peer end adjusts the transmit optical power value of the optical communication device at the peer end according to the power value of the first information when the information arrives at the optical communication device at the peer end. Through the simple signal interaction, the adjustment to the transmit optical power values of the optical communication device and the optical communication device at the peer may be performed at the same time. Therefore, the power consumption of the optical communication device is reduced, and the communication efficiency is improved.

Embodiment 2

Figure 2:
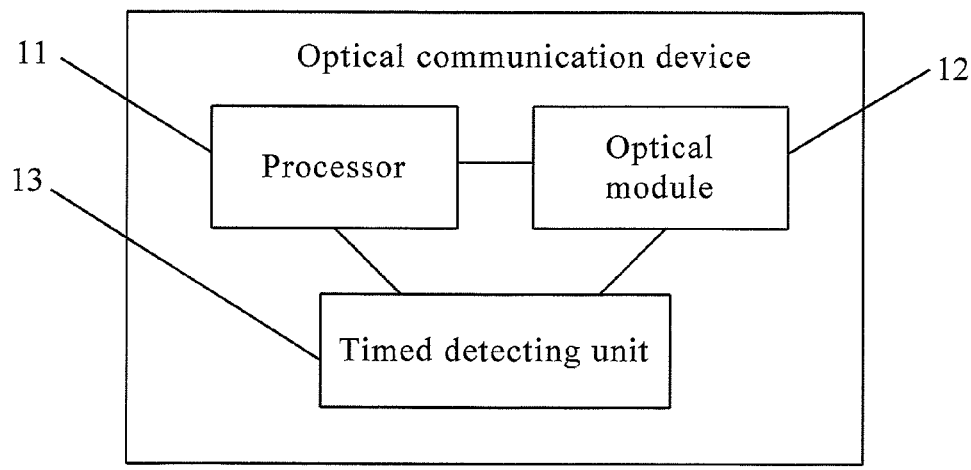
FIG. 2 is a first schematic diagram of an optical communication device according to an embodiment of the present invention.

Based on the preceding embodiment, this embodiment provides an optical communication device as shown in FIG. 2, including a processor 11 and an optical module 12, where the processor 11 is connected to the optical module 12, the optical module 12 is configured to send first information by using a first transmit optical power to an optical communication device at a peer end;

the optical module 12 is further configured to receive second information that is returned by the optical communication device at the peer end after it receives the first information, where the second information includes a receive optical power value of the optical communication device at the peer end when it receives the first information and a minimum receive optical power value that is recognizable for the optical communication device at the peer end; and the processor 11 is configured to, according to the first transmit optical power, and the receive optical power value and minimum receive optical power value in the received second information, reduce the value of transmit optical power of the optical module 12 of the optical communication device 1 to make it be a difference value between the first transmit optical power value and the receive optical power value plus the minimum receive optical power value of the optical communication device at the peer end and a margin value.

Where, the reduced transmit optical power value of the optical communication device is not larger than the maximum transmit optical power value of the optical communication device 1, and is not smaller than the minimum transmit optical power value of the optical communication device.

The optical communication device in this embodiment further includes a timed detecting module 13. The timed detecting module 13 is configured to detect regularly whether the transmit optical power is within a normal range, where being within the normal range means that the transmit optical power value of the optical communication device is within a range from the maximum transmit optical power value to the minimum transmit optical power; and if the transmit optical power value is not within the normal range, the transmit optical power of the optical communication device is adjusted to make it be within the range from the maximum transmit optical power value to the minimum transmit optical power.

The timed detecting module may be implemented based on a timer built in the processor during actual implementation (a general processor, such as a CPU, provides a built-in timer), or by using another hardware circuit, which is not confined herein.

The timed detecting unit 13 is further configured to:

detect regularly whether the receive optical power is within a normal range, where being within the normal range means that the receive optical power value is within a range from a maximum receive optical power value to a minimum receive optical power value; and if the receive optical power value is not within the normal range, send the value of the receive optical power to the optical communication device at the peer end, so as to enable the optical communication device at the peer end to adjust the value of the transmit optical power according to the received value of the receive optical power.

The working principle and working process of each component of the optical communication device in this embodiment are similar to those in the first embodiment, and are not described herein again.

By sending first information that includes a first transmit optical power value through an optical module to an optical communication device at a peer end, receiving, through the optical module, second information that carries information about a receive optical power value and a minimum receive optical power value of the optical communication device at the peer end and is sent from the optical communication device at the peer end, and reducing the transmit optical power value according to the receive optical power value and the minimum receive optical power value of the optical communication device at the peer end through a control unit, the optical communication device in this embodiment reduces its power consumption when the optical module works properly.

Embodiment 3

Figure 3:
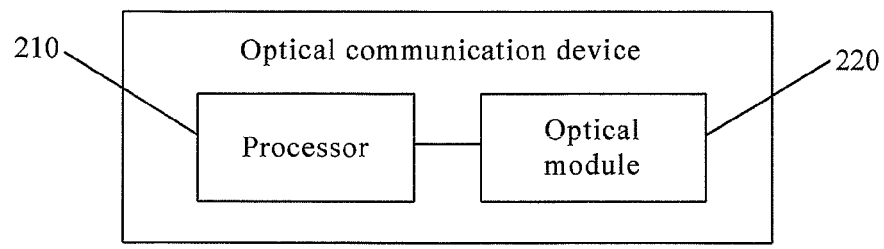
FIG. 3 is a second schematic diagram of an optical communication device according to an embodiment of the present invention.

Based on the first embodiment, this embodiment provides an optical communication device, as shown in FIG. 3, including a processor 210 and an optical module 220, where the processor 210 is connected to the optical module 220, the optical module 220 is connected to an optical communication device at a peer end by using an optical fiber, and is configured to receive first information sent from the optical communication device at the peer end, and the first information is information sent by using the optical fiber by setting a value of transmit optical power of the optical communication device at the peer end to a first transmit optical power value;

the optical module 220 is further configured to send second information to the optical communication device at the peer end, where the second information includes a receive optical power value when the first information is received and a minimum receive optical power value that is recognizable for the optical communication device, so as to enable a processor of the optical communication device at the peer end to adjust, according to the first transmit optical power, and the receive optical power value and minimum receive optical power value in the received second information, the value of transmit optical power of the optical communication device to make it be a difference value between the first transmit optical power value and the receive optical power value plus the minimum receive optical power value and a margin value.

Further, the first information in this embodiment further carries information about the minimum receive optical power value of the optical communication device at the peer end and the first transmit optical power value. After the optical module of the optical communication device receives the first information, the processor 210 reduces, according to the first transmit optical power value and the minimum receive optical power value of the optical communication device at the peer end, the transmit optical power value to a difference value between the first transmit optical power value and the receive optical power value plus the minimum receive optical power value of the optical communication device and a margin value.

The working principle and working process of each component of the optical communication device in this embodiment are similar to those in the first embodiment, and are not described herein again.

By sending first information that includes a first transmit optical power value through an optical module to an optical communication device at a peer end, and sending second information that carries information about a receive optical power value and a minimum receive optical power value of the optical communication device at the peer end to the optical communication device at the peer end for the processor of the optical communication device at the peer end to reduce the transmit optical power value according to the receive optical power value and the minimum receive optical power value of the optical communication device at the peer end, the optical communication device in this embodiment reduces its power consumption when the optical module works properly.

Embodiment 4

Figure 4:
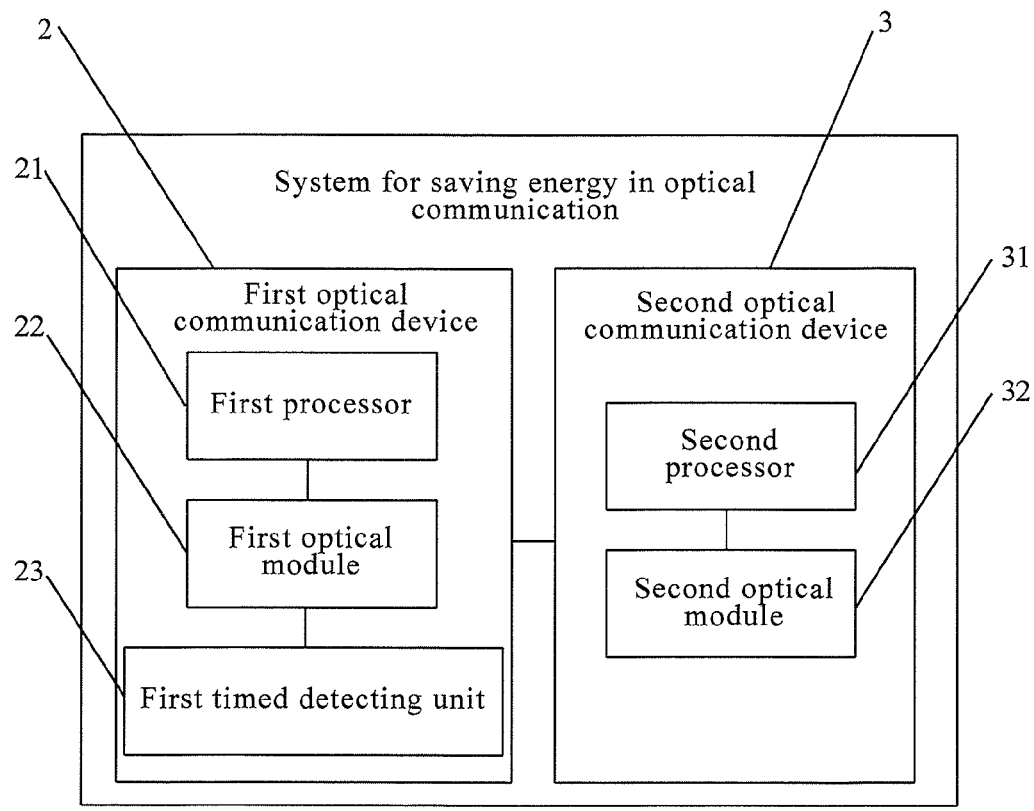
FIG. 4 is a schematic diagram of a system for saving energy in optical communication according to an embodiment of the present invention.

Based on each of the preceding embodiments, this embodiment provides a system for saving energy in optical communication, as shown in FIG. 4, including a first optical communication device 2 and a second optical communication device 3, where the first optical communication device 2 includes a first processor 21 and a first optical module 22, and the first processor 21 is connected to the first optical module 22; the second optical communication device 3 includes a second processor 31 and a second optical module 32, and the second processor 31 is connected to the second optical module 32; the first optical module 22 is connected to the second optical module 32 by using an optical fiber for optical communication, the first processor 21 sends first information through the first optical module 22 to the second optical communication device 3 by using a first transmit optical power;

the second processor 31 in the second optical communication device 3 returns second information through the second optical module 32 to the first processor 21 after receiving the first information through the second optical module 32, where the second information includes a receive optical power value when the second processor 31 receives the first information and a minimum receive optical power value that is recognizable for the second optical module 32; and the first processor 21 is configured to, according to the first transmit optical power, and the receive optical power value and minimum receive optical power value in the received second information, reduce the value of transmit optical power of the first optical module 22 to a difference value between the first transmit optical power value and the receive optical power value plus the minimum receive optical power value of the second optical communication device 3 and a margin value.

Further, the first information carries information about the minimum receive optical power value of the first optical communication device 2 and the first transmit optical power value, so as to enable the second optical communication device 3 to, after receiving the first information, reduce, according to the first transmit optical power value and the minimum receive optical power value of the first optical communication device 2, the value of transmit optical power of the second optical module 32 to a difference value between the first transmit optical power value and the receive optical power value plus the minimum receive optical power value of the first optical communication device 2 and the margin value.

Further, the first optical communication device 2 further includes a timed detecting module 23. The timed detecting module 13 is configured to detect regularly whether the transmit optical power is within a normal range, where being within the normal range means that the transmit optical power value of the optical communication device is within a range from the maximum transmit optical power value to the minimum transmit optical power; and if the transmit optical power value is not within the normal range, the transmit optical power of the optical communication device is adjusted to make it be within the range from the maximum transmit optical power value to the minimum transmit optical power.

The timed detecting unit 23 is further configured to:

detect regularly whether the receive optical power is within a normal range, where being within the normal range means that the receive optical power value is within a range from a maximum receive optical power value to a minimum receive optical power value; and if the receive optical power value is not within the normal range, send the value of the receive optical power to the optical communication device at the peer end, so as to enable the optical communication device at the peer end to adjust the value of the transmit optical power according to the received value of the receive optical power.

In addition, the second communication device 3 may also include a second timed detecting module whose function is similar to that of the first timed detecting module and is not described herein again.

The working principle and working process of each component of the optical communication device in this embodiment are similar to those in the first embodiment, and are not described herein again.

By sending first information that includes a first transmit optical power value through a first optical module to a second optical communication device, receiving, through the first optical module, second information that carries information about a receive optical power value and a minimum receive optical power value of the second optical communication device and is sent from the second optical communication device, and reducing the transmit optical power value according to the receive optical power value, and the minimum receive optical power value of the second optical communication device, the system for saving energy in optical communication in this embodiment reduces the power consumption of an optical communication device when the optical module works properly, improves real time of the optical communication system, and improves the communication efficiency of the optical communication system.

Through descriptions about the embodiments, those skilled in the art may clearly understand that the present invention may be implemented through software by combining necessary general hardware, or through hardware. In most cases, however, the former is a better implementation manner. Based on such understanding, the technical solutions in the present invention may be essentially or the part that contributes to the prior art may be embodied in the form of a software product. This computer software product is stored in a readable storage medium, such as a floppy disk, a hard disk and a compact disk of a computer, and includes several instructions that are configured for a computer device (which may be a personal computer, a server, or a network device) to execute the steps described in each of the preceding embodiments of the present invention.

In conclusion, the above are merely specific embodiments of the present invention. However, the protection scope of the present invention is not limited thereto. Changes or replacements readily apparent to persons skilled in the prior art within the technical scope of the present invention should fall within the protection scope of the present invention. Therefore, the protection scope of the present invention is subject to the appended claims.

What is claimed is:

1. A method for saving energy in optical communication, applied to an optical communication device, wherein the optical communication device is coupled to an optical communication device at a peer end by using an optical fiber for optical communication, and the method comprises:

setting a value of transmit optical power of the optical communication device to a first transmit optical power value to send first information to the optical communication device at the peer end by using an optical fiber;

receiving second information that is returned by the optical communication device at the peer end after it receives the first information, wherein the second info' illation comprises a receive optical power value of the optical communication device at the peer end when it receives the first information and a minimum receive optical power value that is recognizable for the optical communication device at the peer end, wherein the receive optical power value indicates an optical power of the first information when the first information arrives at the optical communication device at the peer end and the minimum receive optical power; and recognizing a minimum transmit power in which messages can be recognized by the optical communication device at the peer end according to a difference value between the first transmit optical power value and the receive optical power value plus the minimum receive optical power value, and adjusting transmit optical power accordingly.

2. The method for saving energy in optical communication according to claim 1, wherein the method further comprises: carrying, in the first information, information about a minimum receive optical power value of the optical communication device and the first transmit optical power value, so as to enable the optical communication device at the peer end to, after receiving the first information, recognize a minimum transmit power in the optical communication device at the peer end according to a difference value between the first transmit optical power value and the receive optical power value plus the minimum receive optical power value of the optical communication device, and adjust transmit optical power accordingly.

3. The method for saving energy in optical communication according to claim 1, further comprising:

detecting regularly whether the transmit optical power is within a range from a maximum transmit optical power value to a minimum transmit optical power value; and if the transmit optical power is not within the range, adjusting the transmit optical power of the optical communication device to be within the range.

4. The method for saving energy in optical communication according to claim 1, further comprising:

detecting regularly whether the receive optical power is within a range from a maximum receive optical power value to a minimum receive optical power value; and if the receive optical power is not within the range, sending the value of the receive optical power to the optical communication device at the peer end, so as to enable the optical communication device at the peer end to adjust the value of the transmit optical power according to the received value of the receive optical power.

5. A method for saving energy in optical communication, applied to an optical communication device, wherein the optical communication device is coupled to an optical communication device at a peer end by using an optical fiber for optical communication, and the method comprises:
receiving first information sent from the optical communication device at the peer end, wherein the first information is information sent by using the optical fiber by setting a value of transmit optical power of the optical communication device at the peer end to a first transmit optical power value; and
sending second information to the optical communication device at the peer end, wherein the second information comprises a receive optical power value when the first information is received and a minimum receive optical power value that is recognizable for the optical communication device, wherein the receive optical power value indicates an optical power of the first information when the first information arrives at the optical communication device at the peer end and the minimum receive optical power value, so as to enable the optical communication device at the peer end to recognize a minimum transmit power in which messages can be recognized by the optical communication device at the peer end according to a difference value between the first transmit optical power value and the receive optical power value plus the minimum receive optical power value, and adjusting transmit optical power accordingly.

6. The method for saving energy in optical communication according to claim 5, wherein the method further comprises: carrying information about a minimum receive optical power value of the optical communication device at the peer end and the first transmit optical power value in the first information;
after receiving the first information, recognizing, by the optical communication device, according to the first transmit optical power value and the minimum receive optical power value of the optical communication device at the peer end, a minimum value of transmit optical power of the optical communication according to a difference value between the first transmit optical power value and the receive optical power value plus the minimum receive optical power value of the optical communication device at the peer end, and adjusting the transmit optical power of the optical communication accordingly.

7. An optical communication device, comprising a processor and an optical module, wherein the processor is coupled to the optical module,
the optical module is coupled to an optical communication device at a peer end by using an optical fiber, and is configured to send first information to the optical communication device at the peer end by using a first transmit optical power through the optical fiber;
the optical module is further configured to receive second information that is returned by the optical communication device at the peer end after it receives the first information, wherein the second information comprises a receive optical power value of the optical communication device at the peer end when it receives the first information and a minimum receive optical power value that is recognizable for the optical communication device at the peer end, wherein the receive optical power value indicates an optical power of the first information when the first information arrives at the optical communication device at the peer end and the minimum receive optical power; and
the processor is configured to recognize a minimum transmit power in which messages can be recognized by the optical communication device at the peer end according to a difference value between the first transmit optical power value and the receive optical power value plus the minimum receive optical power value, and then the optical module adjusts transmit optical power accordingly.

8. The optical communication device according to claim 7, wherein the first information carries information about a minimum receive optical power value of the optical communication device and the first transmit optical power value, so as to enable the optical communication device at the peer end to, after receiving the first information, recognize a minimum transmit power in the optical communication device at the peer end according to a difference value between the first transmit optical power value and the receive optical power value plus the minimum receive optical power value of the optical communication device and adjust transmit optical power accordingly.

9. The optical communication device according to claim 7, further comprising:
a timed detecting unit, configured to detect regularly whether the transmit optical power is within a range from a maximum transmit optical power value to a minimum transmit optical power value; and
if the transmit optical power is not within the range, the transmit optical power of the optical communication device is adjusted to be within the range.

10. The optical communication device according to claim 9, wherein the timed detecting unit is further configured to:
detect regularly whether the receive optical power is within a range from a maximum receive optical power value to a minimum receive optical power value; and
if the receive optical power is not within the range, send the value of the receive optical power to the optical communication device at the peer end, so as to enable the optical communication device at the peer end to adjust the value of the transmit optical power according to the received value of the receive optical power.

11. An optical communication device, comprising a processor and an optical module, wherein the processor is coupled to the optical module, the optical module is coupled to an optical communication device at a peer end by using an optical fiber, and is configured to receive first information sent from the optical communication device at the peer end, and the first information is information sent by using the optical fiber by setting a value of transmit optical power of the optical communication device at the peer end to a first transmit optical power value;
the optical module is further configured to send second information to the optical communication device at the peer end, wherein the second information comprises a receive optical power value when the first information is received and a minimum receive optical power value that is recognizable for the optical communication device, wherein the receive optical power value indicates an optical power of the first information when the first information arrives at the optical communication device at the peer end and the minimum receive optical power, so as to enable a processor of the optical communication device at the peer end to recognize a minimum transmit power in which messages can be recognized by the optical communication device at the peer end according to a difference value between the first transmit optical power value and the receive optical power value plus the minimum receive optical power value, and adjusting transmit optical power accordingly.

12. The optical communication device according to claim 11, wherein information about a minimum receive optical power value of the optical communication device at the peer end and the first transmit optical power value is carried in the first information; after the optical module of the optical communication device receives the first information, the processor recognizes, according to the first transmit optical power value and the minimum receive optical power value of the optical communication device at the peer end, a minimum value of transmit optical power of the optical communication according to a difference value between the first transmit optical power value and the receive optical power value plus the minimum receive optical power value of the optical communication device at the peer end, and adjusts transmit optical power of the optical communication accordingly.

13. A system for saving energy in optical communication, the system comprising:
   a first optical communication device comprising a first processor and a first optical module coupled to the first processor;
   a second optical communication device comprising a second processor and a second optical module coupled to the second processor;
   wherein the first optical module is coupled to the second optical module by an optical fiber for optical communication,
   the first processor sends first information through the first optical module to the second optical communication device by using a first transmit optical power;
   in response to receiving the first information at the second optical communication device, the second processor sends second information through the second optical module to the first optical communication device, wherein the second information comprises a receive optical power value when the second processor receives the first information and a minimum receive optical power value that is recognizable for the second optical module, the receive optical power value indicates an optical power of the first information when the first information arrives at the optical communication device at the peer end and the minimum receive optical power; and
   the first processor is configured to, recognizing a minimum transmit power in which messages can be recognized by the second optical module according to a difference value between the first transmit optical power and the receive optical power value plus the minimum receive optical power value, and adjust transmit optical power of the first optical module accordingly.

14. The system for saving energy in optical communication according to claim 13, wherein information about a minimum receive optical power value of the first optical communication device and the first transmit optical power value is carried in the first information, so as to enable the second optical communication device to, after receiving the first information, recognize, according to the first transmit optical power value and the minimum receive optical power value of the first optical communication device, a minimum value of transmit optical power of the optical module of the second optical communication device to a difference value between the first transmit optical power value and the receive optical power value plus the minimum receive optical power value of the first optical communication device and adjust transmit optical power of the second optical module accordingly.

15. The system for saving energy in optical communication according to claim 13, wherein the first optical communication device further comprises a first timed detecting unit configured to detect regularly whether the transmit optical power is within a range from a maximum transmit optical power value to a minimum transmit optical power value; and
   if the transmit optical power value is not within the range, the transmit optical power in the first optical communication device is adjusted through the first processor to be within the range from the maximum transmit optical power value to the minimum transmit optical power value.

16. The system for saving energy in optical communication according to claim 15, wherein the first timed detecting unit is further configured to detect regularly whether the receive optical power is within a range from a maximum receive optical power value to a minimum receive optical power value; and
   if the receive optical power value is not within the range, the value of the receive optical power is sent through the first optical module to the second optical communication device, so as to enable the second optical communication device to adjust the value of the transmit optical power according to the received value of the receive optical power.

* * * * *